(12) United States Patent
Magno, Jr.

(10) Patent No.: US 7,645,936 B2
(45) Date of Patent: Jan. 12, 2010

(54) TWO-GANG ADJUSTABLE MUD RING

(75) Inventor: Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/046,586

(22) Filed: Mar. 12, 2008

(65) Prior Publication Data

US 2008/0223600 A1    Sep. 18, 2008

Related U.S. Application Data

(60) Provisional application No. 60/906,752, filed on Mar. 13, 2007.

(51) Int. Cl.
*H01H 9/02* (2006.01)

(52) U.S. Cl. .............. 174/53; 174/57; 174/58; 174/50; 220/3.2; 220/3.3

(58) Field of Classification Search .......... 174/480, 174/481, 50, 53, 57, 58, 66, 67, 135; 220/3.2–3.9, 220/4.02, 241, 242; 33/528, DIG. 10
See application file for complete search history.

(56) References Cited

U.S. PATENT DOCUMENTS

| | | | |
|---|---|---|---|
| 2,989,206 A * | 6/1961 | McAfee | 220/3.7 |
| 4,634,015 A | 1/1987 | Taylor | |
| 5,012,043 A | 4/1991 | Seymour | |
| 5,931,325 A | 8/1999 | Filipov | |
| 6,737,576 B1 * | 5/2004 | Dinh | 174/53 |
| 6,820,760 B2 | 11/2004 | Wegner et al. | |
| 6,875,922 B1 | 4/2005 | Petak et al. | |
| 7,276,661 B2 | 10/2007 | Wegner et al. | |
| D555,108 S | 11/2007 | Strong | |
| 7,301,099 B1 | 11/2007 | Korez | |
| 7,410,072 B2 * | 8/2008 | Wegner et al. | 174/57 |
| 7,468,486 B2 * | 12/2008 | Yan | 174/58 |
| 7,495,170 B2 * | 2/2009 | Dinh et al. | 174/58 |

* cited by examiner

*Primary Examiner*—Angel R Estrada
(74) *Attorney, Agent, or Firm*—Hoffman & Baron, LLP

(57) ABSTRACT

This invention pertains to an adjustable cover for an electrical outlet box. The cover is configured having a generally planar mounting plate with a collar surrounding an opening through this mounting plate. An extension sleeve moves within this opening and adjacent the collar. At least one fastener is located adjacent the opening and is movable between a locked position and an unlocked position. The fastener operates a locking device that engages a wedge against the extension sleeve when the fastener is in the locked position and disengages a wedge against the extension sleeve when the fastener is in the unlocked position.

13 Claims, 3 Drawing Sheets

TWO-GANG ADJUSTABLE MUD RING

CROSS-REFERENCE TO RELATED APPLICATION

This application claims priority to U.S. Provisional Patent Application No. 60/906,752 filed on Mar. 13, 2007, all of which are incorporated herein by reference.

FIELD OF THE INVENTION

This invention pertains to a cover of an electrical outlet box and more particularly to a cover having an adjustable extension sleeve attached thereto.

BACKGROUND OF THE INVENTION

During construction, electrical outlet boxes are affixed to their support or stud prior to the wall covering (i.e. dry wall) being installed. It is generally known what thickness of dry wall is going to be installed and hence electrical outlet boxes are installed off-set from the front of the stud by that amount so as to be flush with the wall. However, if the dry wall thickness is not known or if it changes or if additional wall material (i.e. tile, sound insulation, double-layer dry wall) is subsequently added, then the box opening will no longer be flush with the wall and hence it will be difficult, if not impossible, to properly install an electrical device within the box.

Solutions to this problem are varied. U.S. Pat. No. 5,253,831 discloses a bracket that is rigidly affixed to the stud. A box is then adjustably secured to the bracket. Thus, if the wall material is greater or less than expected, the entire box can be adjusted accordingly. Unfortunately, if the code specifies that all wiring to/from the box be contained in conduit, this would mean that the conduit would also have to move along with the box which is not always possible.

U.S. Pat. No. 4,927,039 discloses a removable attachment that abuts the open perimeter of the box. A first (cut-out) wall covering is applied over the box before the attachment is secured against the open front face of the box. Then a second wall covering is installed. Thus, this attachment is configured to accommodate both wall thicknesses, but such thicknesses must be known beforehand so that the proper sized attachment can be ordered. If there is any subsequent change, this attachment cannot be subsequently altered.

A further variation is shown in U.S. Pat. No. 2,378,861 and U.S. Pat. No. 4,634,015. In both of these cases, an extension sleeve is mounted to either the box itself or to the box's cover. The extension sleeve is threadably mounted such that it can be adjusted as needed even after the wall material is installed. In both cases, however, the user must make the adjustments from inside the box which exposes the installer to the oftentimes live wires contained therein. Also, in both cases, long screws are needed as they must be at least as long as the adjustment range of the extension sleeve. Such screws also project well into the box and can interfere with the box's wiring. Further, in both cases, the ground path from the electric device to the box passes through the screw; hence if the screw is loose or the mating threads are not properly sized, grounding issues can surface. Finally, in both cases, the screw is used to position the extension sleeve and hence the extension sleeve can never be rigidly locked into any one position.

It is thus an object of this invention to provide a cover that is inexpensive to manufacture and yet is infinitely adjustable. A further object of this invention is to provide a cover whose adjustable extension sleeve provides a solid ground path for the electric device and which can be easily locked or fixed at a selected position as desired. Still a further object of this invention is to eliminate the need for long screws that can interfere with the box's wiring and to also eliminate the need for the installer to make adjustments from within the box. Yet another object of this invention is to provide a means where adjustments to the box can be made without adjusting the position of the box itself. It is a further object of this invention to provide a means of making adjustments even if the wall thickness varies or if later a new wall covering is applied. These and other objects and advantages of this invention will be come apparent upon further investigation and review.

SUMMARY OF THE INVENTION

This invention pertains to an adjustable cover that is mounted to an electrical outlet box. The cover incorporates a mounting plate that extends over a portion of the electrical outlet box. This cover includes a collar that surrounds an opening with this collar having a distal end spaced from the mounting plate. An extension sleeve fits within this collar and moves with respect thereto. Adjacent the opening is at least one fastener, this fastener being movable between a locking position and an unlocking position. The fastener operates a locking device to selectively cause such device to engage or disengage the extension sleeve in order to selectively lock or unlock the extension sleeve with respect to the mounting plate.

DETAILED DESCRIPTION OF THE PREFERRED EMBODIMENT

Figure 1:
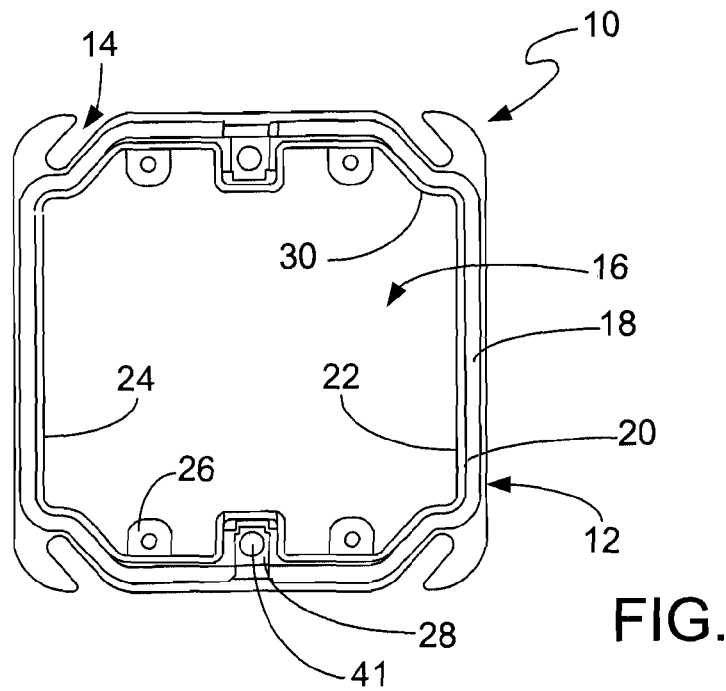
FIG. 1 is a top view of the box cover of the present invention.

Referring to FIGS. 1-8, there is shown an adjustable device cover 10 of the present invention including a mounting plate 12, an extension sleeve 22 and a locking device 50. This assembly includes a generally rectangular base or mounting plate 12 that is used to secure device cover 10 to an electrical outlet box (not shown) and preferably a two or more gang box such as a 4 inch square or a 4¹¹⁄₁₆ inch square box. A series of slots or apertures 14 are spaced along the perimeter of plate 12 through which one or more fasteners would extend so as to mount cover 10 to the outlet box in the convention fashion. These slots 14 are preferably arranged so that mounting plate 12 can be secured to the box in a variety of different orientations.

Figure 5:
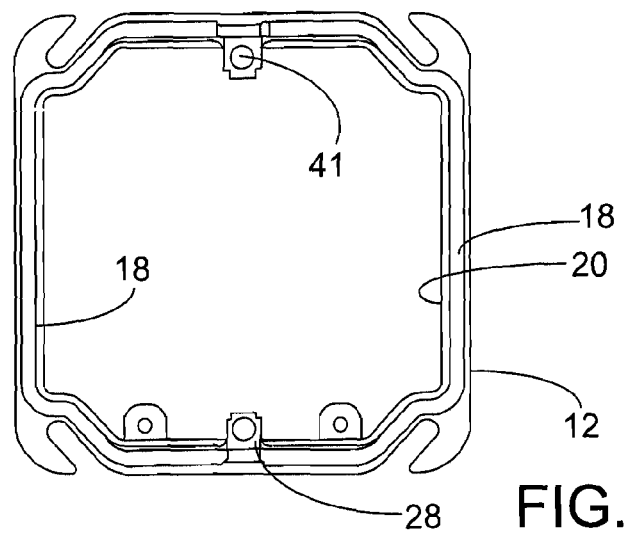
FIG. 5 is a top perspective view of the mounting plate of the present invention.
Figures 6, 7:
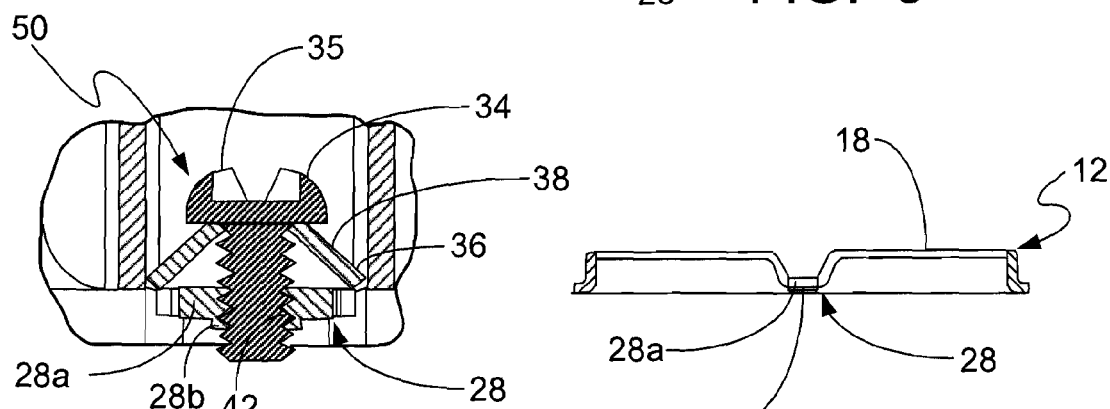
FIG. 6 is a cross-sectional view of the mounting plate of FIG. 5 along A-A.
FIG. 7 is a cross-sectional view of the locking device of FIG. 1.

The center of cover 10 contains a large opening 16 that permits access through cover 10 to the interior of the electrical outlet box. Surrounding and generally defining opening 16 is collar 18 which projects away from and generally perpendicular to mounting plate 12. FIGS. 5 and 6 show the upper distal end 20 of collar 18 is generally rounded, being curved towards opening 16. FIG. 6 shows tab 28 is recessed or inset from the collar 18. The collar 18 includes at least one inwardly facing tab 28. The tab 28 projects inwardly toward the opening 16. FIGS. 1-3, 5 and 6 show two opposing tabs 28. The tabs 28 include aperture 41 used for locking the extension sleeve 22 to the mounting plate 12 as shown in FIG. 7. Tab 28 includes an interior threaded portion 42 which mates with the exterior threading of fastener 34 to lock the fastener in place.

Figure 2:
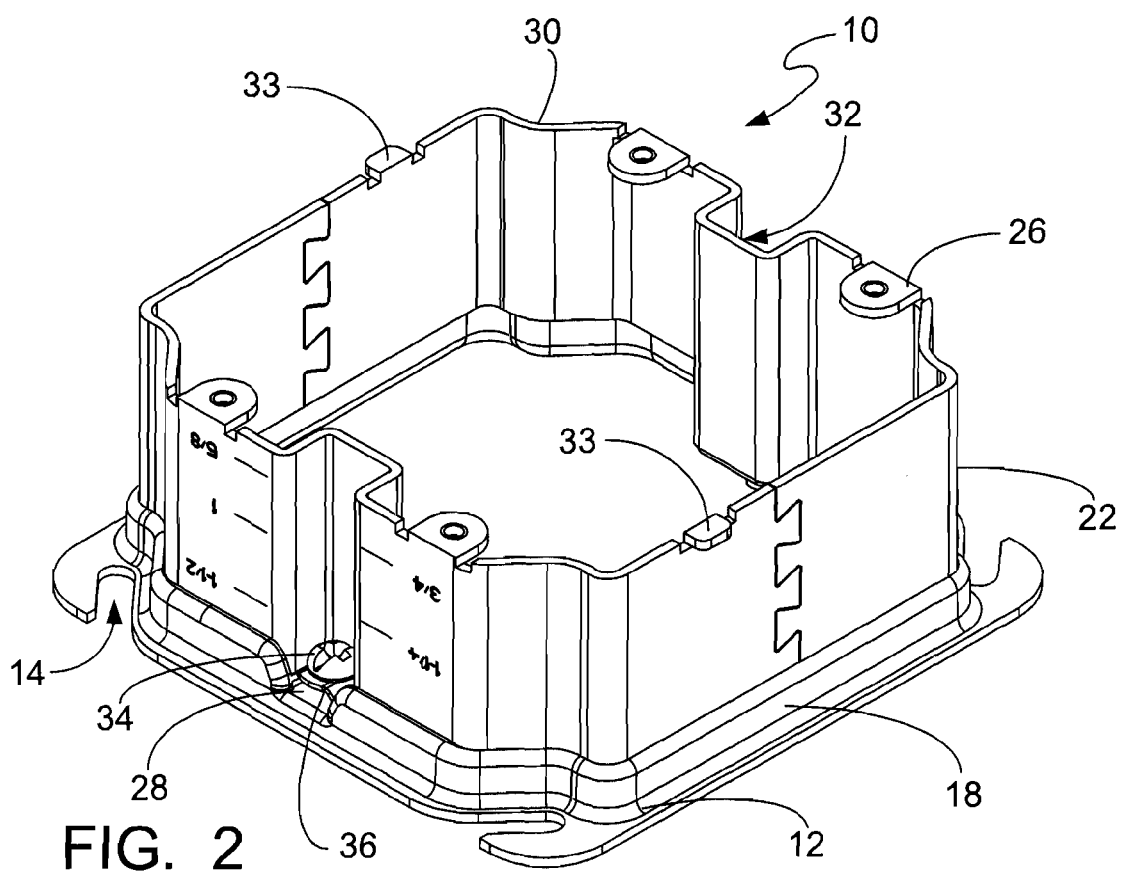
FIG. 2 is a top perspective view of the cover of FIG. 1.
Figure 3:
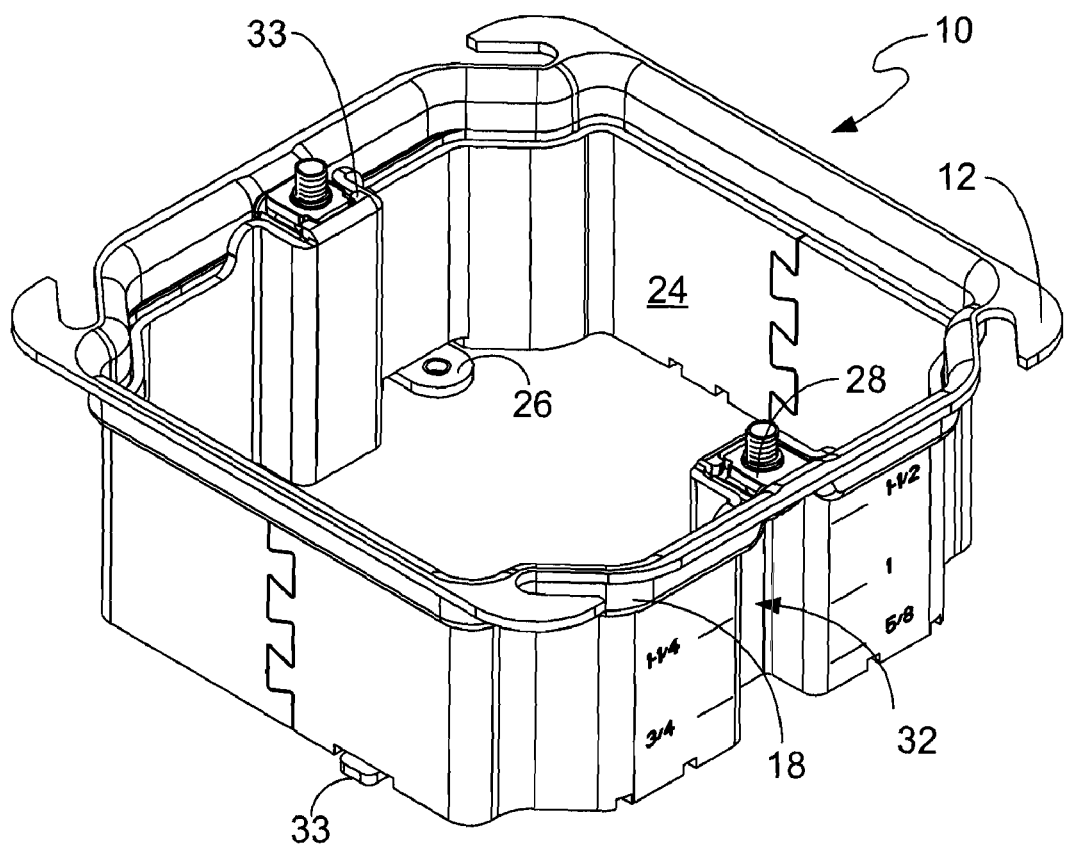
FIG. 3 is a bottom view of the cover of FIG. 2.
Figure 4:
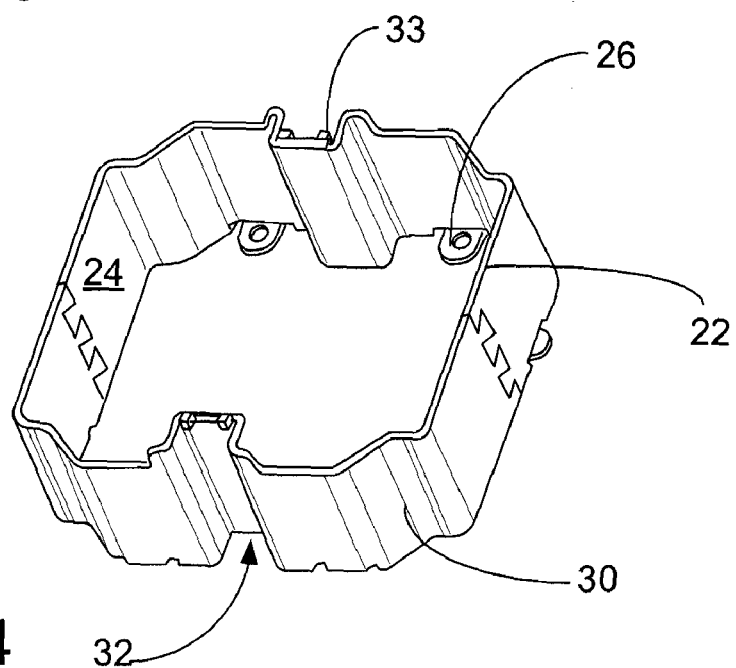
FIG. 4 is bottom perspective view of the extension sleeve of the present invention.

FIGS. 1-3 show slidably positioned within collar 18 is extension sleeve 22. Extension sleeve 22 is generally an open box-like structure having sidewalls 24 corresponding with opening 16. The depth of sidewalls 24 is approximately the amount of adjustment provided by cover 10, hence such depth can be varied by the manufacturer as needed. Extension sleeve 22 contains device mounting tabs 26 which are used to secure an electric device (not shown) to cover 10. The sidewall(s) 24 which would run adjacent to tab(s) 28 of the collar 18 include a concaved portion or a channel 32 that closely conforms to tab 28 and which protrudes into the opening 16. The tab 28 travels through the channel 32 until the preferred position is obtained and the extension sleeve 22 is secured in position accordingly. Also, if desired, extension sleeve 22 can be configured with upper stops and/or lower stops 33 that prevent extension sleeve 22 from sliding out of mounting plate 12. Such stops can consist primarily of small projections that engage distal end 20 of collar 18 or tab 28 but cannot pass through opening 16.

The opposite corners 30 of extension sleeve 22 are beveled or angled inwardly into opening 16. While this bevel is shown as being slightly curved into the opening 16, other configurations are possible if desired such as to accommodate both the electrical device mounted to tabs 26 as well as the mounting screws passing through slots 14. It is also possible that the four corners 30 of extension sleeve 22 are regular 90 degree corners. In some cases, protruding stops are located at one or more such corners 30 which help prevent extension sleeve 22 from sliding out of collar 18. However, these stops are not required for the operation of cover 10.

Figure 8:
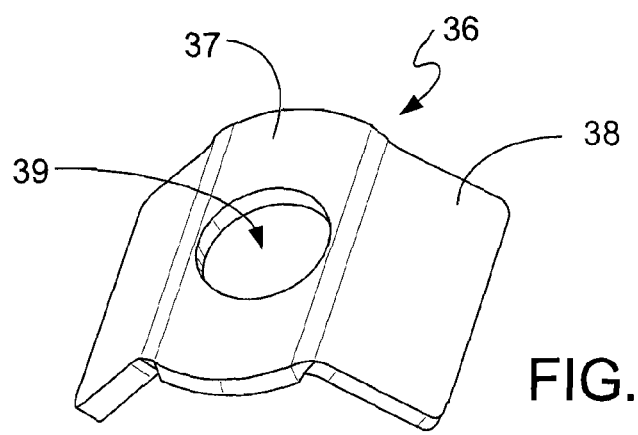
FIG. 8 is a top perspective view of the wedge of the present invention.

The cover 10 includes a short fastener 34 that passes through aperture 39 of wedge 36 and proceeds into the inward tab 28 through aperture 41. These fasteners 34 are adjustable between a locking position and an unlocking position. Loosely contained by fastener 34 when in the unlocked position is a wedge 36. FIGS. 7 and 8 show wedge 36 is configured with a pair of distal ends having downwardly angled end regions 38 that will flex outwardly to meet the walls of the channel 32 by the moment of head 35 of fastener 34 toward the tab 28. Tab 28 has an upper portion 28a and a lower portion 28b which is smaller then the upper portion 28a. Aperture 41 extends through tab 28 including portion 28a and portion 28b. The aperture 4 is threaded 42 to mate with the exterior threading of fastener 34 to lock the fastener 34 in position within aperture 41. Wedge 36 is shown in FIGS. 7 and 8 as having a flared U-shaped configuration, or having a planar rectangular portion 37 with two wings depending therefrom. The two wings are two downwardly extending end regions 38, extending from either side of the planar portion 37 so as to engage both mechanically and electrically as fully as possible the surface of the channel 32 walls when in the locked position. The planar portion 37 includes an aperture 39 therethrough for the fastener 34 to extend therethrough, as shown in FIG. 7. However, it is contemplated that the wedge 36 may have other configurations which will allow for the same function. For example, the wedge 36 can include end regions 38 which angle upwardly such that they can engage with the walls of the channel.

FIGS. 1-3 and 7 show wedge 36 is sized so that while it is loosely restrained by fastener 34, extension sleeve 22 can move freely with respect to mounting plate 12. The fastener 34 extends through the wedge 36 and then threaded through the aperture 41 of the tab 28 in the mounting plate 12. A nut may optionally be added at the end of the fastener and below the tab 28. In this configuration, the wedge 36 is sandwiched between the collar 18 and the head of fastener 34. Once extension 22 is properly positioned then subsequent tightening of fastener 34 drives the fastener 34 downward along the threads 42 of tab 28. As the head of the fastener 34 nears tab 28, it forces the end regions 38 of the wedge 36 outwardly against the wall of the channel 32. This outward expansion then forces or biases the wedge 36 against the channel 32 to hold extension 22 in place. Such force as applied by wedge 36 will bind or lock extension sleeve 22 within collar 18, and especially when multiple such fasteners 34 are tightened. Thus extension sleeve 22 will be locked in place within cover 10 via a fastener 34 located outside central opening 16. Further, the surfaces of end regions 38 engage a similarly shaped (i.e. planar) surface on the channel 32 which provides for much greater contact between mounting plate 12 and extension sleeve 22. This provides for a more reliable ground connection between the two. Alternatively, channel 32 and/or end regions 38 could be roughened so as to increase the holding power and/or electrical connectivity between them. To release the wedge 36, one need only rotate the fastener 34 so as to release the bias thereby allowing the wedge 36 to return to its original U-shaped configuration having downwardly facing angled end regions 38.

Further, the extension sleeve 22 may include markings to identify the proper placement of mounting plate 12 thereabout for the specified wall thickness.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. An adjustable cover for an electrical outlet box comprising:
   (a) a mounting plate having a collar surrounding an opening, said collar having a distal end region remote from said mounting plate, said collar including at least one tab protruding into said opening;
   (b) an extension sleeve sized to move within said opening adjacent said distal end of said collar, said extension sleeve including a U-shaped channel along an exterior sidewall of said extension sleeve to allow said at least one tab to travel within said channel;
   (c) at least one fastener extending through said tab and movable between a locking and an unlocking position; and
   (d) a locking device operable by said fastener, said locking device configured to selectively engage and disengage said extension sleeve so as to selectively lock and unlock said extension sleeve with respect to said mounting plate.

2. The adjustable cover as set forth in claim 1 wherein a first said fastener and locking device is located through a first said tab and a second said fastener and locking device is located through an opposing tab.

3. The adjustable cover as set forth in claim 1 wherein said locking device includes a wedge, said fastener extends through said wedge.

4. The adjustable cover as set forth in claim 3 wherein said at least one tab includes an interior threaded aperture.

5. The adjustable cover as set forth in claim 4 wherein said wedge is sandwiched between said at least one tab and a head of said fastener.

6. The adjustable cover as set forth in claim 5 wherein said extension sleeve is configured with mating surfaces for engagement thereof by said wedge.

7. The adjustable cover as set forth in claim 5 wherein said wedge has a generally U-shaped configuration, two sides of said sides being angled downward toward said at least one tab.

8. An adjustable cover for an electrical outlet box comprising:
(a) a mounting plate having an inner rim, said inner rim defining an opening, said inner rim including two opposing tabs on opposite sides of said inner rim and protruding into said opening;
(b) an extension sleeve extending adjacent to said inner rim and said opening, said extension sleeve extending generally perpendicular to said mounting plate, said extension sleeve being freely movable within said inner rim, said extension sleeve including a U-shaped channel on an exterior sidewall;
(c) two locking devices, each device including a fastener and a wedge, each fastener extending through one of said wedges and one of said two tabs, said locking devices configured to selectively engage and disengage said extension sleeve so as to selectively lock and unlock said extension sleeve with respect to said mounting plate.

9. The adjustable cover as set forth in claim 8 wherein each of said tabs include a threaded portion for mating with each of said fasteners.

10. The adjustable cover as set forth in claim 9 wherein said wedge is sandwiched between said mounting plate and a head of said fastener.

11. The adjustable cover as set forth in claim 10 wherein said extension sleeve is configured with mating surfaces for engagement thereof by said wedge.

12. The adjustable cover as set forth in claim 11 wherein said wedge has a generally U-shaped configuration.

13. The adjustable cover as set forth in claim 12 wherein said wedge is configured with at least one end region for engagement thereof with a surface of said extension sleeve to facilitate locking said extension sleeve to said mounting plate at a desired position.

* * * * *